United States Patent
Camaisa et al.

(10) Patent No.: US 8,528,078 B2
(45) Date of Patent: Sep. 3, 2013

(54) SYSTEM AND METHOD FOR BLOCKING UNAUTHORIZED NETWORK LOG IN USING STOLEN PASSWORD

(75) Inventors: Allan Camaisa, La Jolla, CA (US); Jonas Samuelsson, San Diego, CA (US)

(73) Assignee: Anakam, Inc., San Diego, CA (US)

( * ) Notice: Subject to any disclaimer, the term of this patent is extended or adjusted under 35 U.S.C. 154(b) by 528 days.

(21) Appl. No.: 11/824,694

(22) Filed: Jul. 2, 2007

(65) Prior Publication Data
US 2007/0266257 A1 Nov. 15, 2007

Related U.S. Application Data (63) Continuation-in-part of application No. 11/257,421, filed on Oct. 24, 2005, which is a continuation-in-part of application No. 11/077,948, filed on Mar. 11, 2005, which is a continuation-in-part of application No. 10/892,584, filed on Jul. 15, 2004, now Pat. No. 7,676,834.

(51) Int. Cl.
*G06F 11/00* (2006.01)

(52) U.S. Cl.
USPC ............... 726/22; 726/18; 713/155; 713/168; 713/182; 713/184

(58) Field of Classification Search
USPC ........................................................ 726/22
See application file for complete search history.

(56) References Cited

U.S. PATENT DOCUMENTS

| | | | |
|---|---|---|---|
| 4,869,717 | A | 9/1989 | Adair |
| 5,590,199 | A | 12/1996 | Krajewski et al. |
| 5,737,421 | A | 4/1998 | Audebert |
| 5,802,176 | A | 9/1998 | Audebert |
| 5,887,065 | A | 3/1999 | Audebert |
| 5,937,068 | A | 8/1999 | Audebert |
| 5,982,898 | A | 11/1999 | Hsu et al. |
| 6,035,404 | A | 3/2000 | Zhao |
| 6,047,268 | A | 4/2000 | Bartoli et al. |

(Continued)

FOREIGN PATENT DOCUMENTS

| | | |
|---|---|---|
| EP | 1766839 | 3/2013 |
| WO | WO 03/007571 A1 | 1/2003 |
| WO | 2010127263 | 11/2010 |

OTHER PUBLICATIONS

Jonas Samuelsson, Allan Camaisa; "System and Method for Second Factor Authentication Services", Non-Final Office Action dated Dec. 9, 2010 of co-pending U.S. Appl. No. 12/142,232, filed Jun. 19, 2008.

(Continued)

*Primary Examiner* — Ashok Patel
*Assistant Examiner* — Gary Gracia
(74) *Attorney, Agent, or Firm* — Kilpatrick Townsend & Stockton LLP (57) ABSTRACT

The authenticity of a website is determined using a unique string of characters known only to the user and the website on each page of the website that is displayed to the user, with a false site being incapable of displaying this unique string of characters, thereby putting the user on notice that the current site is not the authentic one the user desires to access. Voice methods for conveying one-time pass codes to users and for permitting customer institutions to select authentication rules are also disclosed.

23 Claims, 6 Drawing Sheets system (56) References Cited

U.S. PATENT DOCUMENTS

| | | | |
|---|---|---|---|
| 6,076,163 A | 6/2000 | Hoffstein | |
| 6,085,320 A | 7/2000 | Kaliski | |
| 6,130,621 A | 10/2000 | Weiss | |
| 6,157,920 A | 12/2000 | Jakobsson | |
| 6,189,098 B1 | 2/2001 | Kaliski | |
| 6,202,159 B1 | 3/2001 | Ghafir et al. | |
| 6,240,184 B1 | 5/2001 | Huynh | |
| 6,269,163 B1 | 7/2001 | Rivest | |
| 6,286,022 B1 | 9/2001 | Kaliski | |
| 6,301,362 B1 | 10/2001 | Matyas et al. | |
| 6,308,268 B1 | 10/2001 | Audebert | |
| 6,317,777 B1 * | 11/2001 | Skarbo et al. | 709/204 |
| 6,373,969 B1 | 4/2002 | Adler | |
| 6,374,359 B1 * | 4/2002 | Shrader et al. | 726/5 |
| 6,389,442 B1 | 5/2002 | Yin | |
| 6,393,447 B1 | 5/2002 | Jakobsson | |
| 6,411,715 B1 | 6/2002 | Liskov | |
| 6,429,927 B1 | 8/2002 | Borza | |
| 6,434,259 B1 | 8/2002 | Hamid | |
| 6,446,052 B1 | 9/2002 | Juels | |
| 6,446,210 B1 | 9/2002 | Borza | |
| 6,460,141 B1 | 10/2002 | Olden | |
| 6,498,861 B1 | 12/2002 | Hamid | |
| 6,584,505 B1 | 6/2003 | Howard et al. | |
| 6,598,072 B1 | 7/2003 | McBrearty et al. | |
| 6,662,231 B1 | 12/2003 | Drosset et al. | |
| 6,694,436 B1 | 2/2004 | Audebert | |
| 6,700,606 B1 | 3/2004 | Borza | |
| 6,721,891 B1 | 4/2004 | Borza | |
| 6,751,654 B2 | 6/2004 | Massarani et al. | |
| 6,760,844 B1 | 7/2004 | McCarthy et al. | |
| 6,769,068 B1 | 7/2004 | Brozowski et al. | |
| 6,772,954 B2 | 8/2004 | Boyer | |
| 6,813,354 B1 | 11/2004 | Jakobsson | |
| 6,831,980 B1 | 12/2004 | Borza | |
| 6,836,845 B1 | 12/2004 | Lennie et al. | |
| 6,848,052 B2 | 1/2005 | Hamid | |
| 6,857,078 B2 | 2/2005 | Colvin | |
| 7,032,026 B1 | 4/2006 | Biswas | |
| 7,100,049 B2 | 8/2006 | Gasparini et al. | |
| 7,275,263 B2 | 9/2007 | Bajikar et al. | |
| 7,345,775 B2 | 3/2008 | Kimura | |
| 7,346,775 B2 | 3/2008 | Gasparinl et al. | |
| 7,360,096 B2 | 4/2008 | Bracewell et al. | |
| 7,418,596 B1 | 8/2008 | Carroll | |
| 7,426,530 B1 | 9/2008 | Rosko et al. | |
| 7,437,408 B2 | 10/2008 | Schwartz et al. | |
| 7,464,162 B2 | 12/2008 | Chan | |
| 7,536,433 B2 | 5/2009 | Reilly | |
| 7,562,222 B2 | 7/2009 | Gasparini et al. | |
| 7,571,466 B2 | 8/2009 | Mitchell et al. | |
| 7,665,127 B1 | 2/2010 | Rao et al. | |
| 7,685,631 B1 * | 3/2010 | Paya et al. | 726/8 |
| 7,725,490 B2 | 5/2010 | Hitchen et al. | |
| RE41,546 E | 8/2010 | Vainstein | |
| 7,813,986 B2 | 10/2010 | Gardner et al. | |
| 7,822,989 B2 | 10/2010 | Libin et al. | |
| 7,840,573 B2 | 11/2010 | Adams et al. | |
| 8,006,300 B2 | 8/2011 | Mizrah | |
| 8,078,873 B2 | 12/2011 | Shah et al. | |
| 8,079,070 B2 | 12/2011 | Camaisa | |
| 8,219,822 B2 | 7/2012 | Camaisa et al. | |
| 8,296,562 B2 | 10/2012 | Williams et al. | |
| 2001/0014895 A1 * | 8/2001 | Sappal | 707/500 |
| 2001/0029585 A1 * | 10/2001 | Simon et al. | 713/200 |
| 2001/0036297 A1 * | 11/2001 | Ikegami et al. | 382/115 |
| 2001/0037451 A1 | 11/2001 | Bhagavatula | |
| 2001/0037466 A1 | 11/2001 | Fukutake et al. | |
| 2001/0044896 A1 | 11/2001 | Schwartz et al. | |
| 2002/0029279 A1 | 3/2002 | Campbell et al. | |
| 2002/0031230 A1 | 3/2002 | Sweet et al. | |
| 2002/0059425 A1 | 5/2002 | Belfiore | |
| 2002/0073042 A1 | 6/2002 | Maritzen et al. | |
| 2002/0131402 A1 * | 9/2002 | Lee et al. | 370/352 |
| 2002/0133706 A1 | 9/2002 | Khanna et al. | |
| 2002/0169961 A1 * | 11/2002 | Giles et al. | 713/175 |
| 2002/0169988 A1 * | 11/2002 | Vandergeest et al. | 713/201 |
| 2002/0184496 A1 | 12/2002 | Mitchell et al. | |
| 2003/0005308 A1 | 1/2003 | Rathbun et al. | |
| 2003/0018707 A1 * | 1/2003 | Flocken | 709/203 |
| 2003/0033245 A1 * | 2/2003 | Kahr | 705/39 |
| 2003/0046551 A1 * | 3/2003 | Brennan | 713/185 |
| 2003/0093430 A1 | 5/2003 | Mottur | |
| 2003/0097573 A1 | 5/2003 | Wheeler | |
| 2003/0140230 A1 * | 7/2003 | de Jong et al. | 713/182 |
| 2003/0149900 A1 | 8/2003 | Glassman et al. | |
| 2003/0154406 A1 * | 8/2003 | Honarvar et al. | 713/201 |
| 2003/0159068 A1 * | 8/2003 | Halpin et al. | 713/201 |
| 2003/0163739 A1 * | 8/2003 | Armington et al. | 713/202 |
| 2003/0177351 A1 | 9/2003 | Skingle | |
| 2003/0188186 A1 | 10/2003 | Cherry | |
| 2003/0200202 A1 | 10/2003 | Hsiao | |
| 2003/0217288 A1 | 11/2003 | Guo et al. | |
| 2003/0229782 A1 * | 12/2003 | Bible et al. | 713/155 |
| 2004/0059951 A1 | 3/2004 | Pinkas et al. | |
| 2004/0098609 A1 | 5/2004 | Bracewell et al. | |
| 2004/0103203 A1 | 5/2004 | Nichols et al. | |
| 2004/0103297 A1 * | 5/2004 | Risan et al. | 713/200 |
| 2004/0103300 A1 | 5/2004 | Risan et al. | |
| 2004/0111621 A1 | 6/2004 | Himberger et al. | |
| 2004/0123103 A1 | 6/2004 | Risan et al. | |
| 2004/0136510 A1 * | 7/2004 | Vander Veen | 379/88.22 |
| 2004/0139318 A1 * | 7/2004 | Fiala et al. | 713/165 |
| 2004/0143523 A1 * | 7/2004 | Pegaz-Paquet et al. | 705/34 |
| 2004/0168083 A1 * | 8/2004 | Gasparini et al. | 713/201 |
| 2004/0172535 A1 | 9/2004 | Jakobsson | |
| 2004/0186995 A1 * | 9/2004 | Yim et al. | 713/168 |
| 2004/0187018 A1 * | 9/2004 | Owen et al. | 713/200 |
| 2004/0250076 A1 * | 12/2004 | Kung | 713/175 |
| 2005/0015601 A1 * | 1/2005 | Tabi | 713/182 |
| 2005/0054994 A1 | 3/2005 | Cioanta et al. | |
| 2005/0108551 A1 | 5/2005 | Toomey | |
| 2005/0138109 A1 | 6/2005 | Redlich et al. | |
| 2005/0154887 A1 * | 7/2005 | Birk et al. | 713/168 |
| 2005/0160042 A1 * | 7/2005 | Russell et al. | 705/50 |
| 2005/0165276 A1 | 7/2005 | Belson et al. | |
| 2005/0176449 A1 * | 8/2005 | Cui et al. | 455/466 |
| 2005/0177730 A1 | 8/2005 | Davenport et al. | |
| 2005/0183032 A1 * | 8/2005 | Bushey et al. | 715/809 |
| 2005/0228993 A1 * | 10/2005 | Silvester et al. | 713/168 |
| 2005/0268100 A1 | 12/2005 | Gasparini et al. | |
| 2005/0268107 A1 | 12/2005 | Harris | |
| 2005/0269401 A1 | 12/2005 | Spitzer et al. | |
| 2006/0015742 A1 | 1/2006 | Camaisa et al. | |
| 2006/0015743 A1 | 1/2006 | Camaisa et al. | |
| 2006/0069921 A1 | 3/2006 | Camaisa et al. | |
| 2006/0106605 A1 | 5/2006 | Saunders et al. | |
| 2006/0206709 A1 | 9/2006 | Labrou et al. | |
| 2007/0123840 A1 | 5/2007 | Cox | |
| 2007/0136517 A1 | 6/2007 | Edling | |
| 2007/0163585 A1 | 7/2007 | Uesugi et al. | |
| 2007/0180496 A1 | 8/2007 | Fransdonk | |
| 2007/0203517 A1 | 8/2007 | Williams et al. | |
| 2008/0091682 A1 | 4/2008 | Lim | |
| 2008/0098464 A1 | 4/2008 | Mizrah | |
| 2008/0114980 A1 | 5/2008 | Sridhar | |
| 2008/0189776 A1 | 8/2008 | Constable | |
| 2008/0201159 A1 | 8/2008 | Gabrick et al. | |
| 2008/0250477 A1 | 10/2008 | Samuelsson et al. | |
| 2008/0301570 A1 | 12/2008 | Milstead et al. | |
| 2009/0094674 A1 | 4/2009 | Schwartz et al. | |
| 2009/0167486 A1 | 7/2009 | Shah et al. | |
| 2009/0235339 A1 | 9/2009 | Mennes et al. | |
| 2009/0259848 A1 | 10/2009 | Williams et al. | |
| 2009/0327724 A1 | 12/2009 | Shah et al. | |
| 2010/0100967 A1 | 4/2010 | Douglas et al. | |
| 2010/0185860 A1 | 7/2010 | Mishra et al. | |

OTHER PUBLICATIONS

Jonas Samuelsson, Allan Camaisa; "System and Method for Second Factor Authentication Services", Amendment filed Jan. 20, 2011 in response Non-Final Office Action dated Dec. 9, 2010 of co-pending U.S. Appl. No. 12/142,232, filed Jun. 19, 2008.

Response to Office Action for U.S. Appl. No. 11/077,948, filed Jan. 4, 2011 (8 pages).
Response to Office Action for U.S. Appl. No. 11/077,948, filed Jan. 7, 2009 (4 pages).
Response to Office Action for U.S. Appl. No. 11/077,948, filed May 7, 2009 (4 pages).
Amendment and Response to Non-Final Office Action for U.S. Appl. No. 11/077,948, filed May 25, 2011 (14 pages).
Response to Office Action for U.S. Appl. No. 11/077,948, filed Oct. 5, 2009 (6 pages).
Amendment and Supplemental Response to Office Action for U.S. Appl. No. 11/077,948, filed Nov. 12, 2009 (7 pages).
Response to Office Action for U.S. Appl. No. 11/257,421, filed Oct. 20, 2009 (3 pages).
Response to Office Action for U.S. Appl. No. 11/257,421, filed Jan. 15, 2009 (5 pages).
Response to Office Action for U.S. Appl. No. 11/257,421, filed Jan. 16, 2009 (5 pages).
Response to Office Action for U.S. Appl. No. 11/257,421, filed Apr. 16, 2010 (8 pages).
Response to Office Action for U.S. Appl. No. 11/257,421, filed Oct. 4, 2010 (4 pages).
Response to Notice of Non-Compliant Amendment for U.S. Appl. No. 12/142,232, filed Jan. 20, 2011 (8 pages).
Response to Office Action for U.S. Appl. No. 10/892,584, filed Sep. 28, 2007 (14 pages).
Response to Office Action for U.S. Appl. No. 10/892,584, filed Apr. 9, 2008 (42 pages).
Response to Office Action for U.S. Appl. No. 10/892,584, filed Aug. 20, 2008 (16 pages).
Corrected Response to Office Action for U.S. Appl. No. 10/892,584, filed Nov. 4, 2009 (9 pages).
Amendment and Response to Final Office Action, for U.S. Appl. No. 12/142,232, filed Jul. 29, 2011 (11 pages).
Non-Final Office Action for U.S. Appl. No. 11/077,948, mailed Jan. 24, 2011.
Final Office Action for U.S. Appl. No. 11/077,948, mailed Dec. 7, 2010.
Non-Final Office Action for U.S. Appl. No. 11/077,948, mailed Jul. 16, 2009.
Non-Final Office Action for U.S. Appl. No. 11/077,948, mailed Apr. 9, 2009.
Non-Final Office Action for U.S. Appl. No. 11/077,948, mailed Oct. 16, 2008.
Rodry, "Cookie based authentication: is it secure?," http://www.perimonks.org?node.sub—id=29228, Retrieved data Apr. 29, 2009, published on Aug. 18, 2000 (4 pages).
Final Office Action for U.S. Appl. No. 12/142,232, mailed Mar. 29, 2011 (11 pages).
Non-Final Office Action for U.S. Appl. No. 11/257,421, mailed Dec. 29, 2008 (12 pages).
Final Office Action for U.S. Appl. No. 11/257,421, mailed Apr. 20, 2009 (21 pages).
Non-Final Office Action for U.S. Appl. No. 11/257,421, mailed Oct. 19, 2009 (20 pages).
Non-Final Office Action for U.S. Appl. No. 11/257,421, mailed Apr. 14, 2010 (25 pages).
Non-final Office Action for U.S. Appl. No. 10/892,584, mailed Jan. 8, 2009 (18 pages).
Non-final Office Action for U.S. Appl. No. 10/892,584, mailed Jul. 6, 2009 (19 pages).
Final Office Action for U.S. Appl. No. 10/892,584, mailed Jul. 22, 2008 (15 pages).
Non-final Office Action for U.S. Appl. No. 10/892,584, mailed Dec. 13, 2007 (20 pages.
Advisory Action for U.S. Appl. No. 10/892,584, mailed Aug. 29, 2008 (3 pages).
Notice of Allowance for U.S. Appl. No. 10/892,584, mailed Dec. 29, 2009 (16 pages).
Non-Final Office Action for U.S. Appl. No. 10/892,584, mailed Sep. 6, 2007 (15 pages).
U.S. Appl. No. 11/077,948, Notice of Allowance mailed Aug. 12, 2011 (11 pages).
U.S. Appl. No. 12/142,232, Office Action mailed Oct. 6, 2011 (13 pages).
U.S. Appl. No. 11/257,421, Office Action mailed Nov. 28, 2011 (6 pages).
U.S. Appl. No. 12/434,442, Office Action mailed Dec. 16, 2011 (10 pages).
U.S. Appl. No. 12/475,028, Office Action mailed Jan. 5, 2012 (12 pages).
Response to Non-Final Office Action for U.S. Appl. No. 12/142,232, filed Feb. 6, 2012 (10 pages).
U.S. Appl. No. 12/142,232, "Office Action", mailed Nov. 26, 2012, 20 pages.
U.S. Appl. No. 12/475,028 , "Office Action", mailed Oct. 15, 2012 (22 Pages).
U.S. Appl. No. 11/257,421 , "Notice of Allowance" mailed Mar. 19, 2012 (9 pages).
U.S. Appl. No. 12/142,232, "Office Action Response" filed Feb. 6, 2012 (10 pages).
U.S. Appl. No. 12/434,442, "Notice of Allowance" mailed Jun. 26, 2012 (29 pages).
U.S. Appl. No. 12/434,442, "Response to Non-Final Office Action" filed Mar. 16, 2012 (15 pages).
European Patent Application No. 05750620.6, "Communication Pursuant to Article 94(3) EPC" mailed Dec. 23, 2010 (5 pages).
European Patent Application No. 05750620.6, "Office Action Response" filed Jun. 9, 2011 (38 pages).
European Patent Application No. 05750620.6, "Invitation Pursuant to Article 94(3) and Rule 71(1) EPC" mailed May 4, 2012 (2 pages).
U.S. Appl. No. 12/142,232, Notice of Allowance, mailed May 10, 2013 (14 pages).

* cited by examiner

Figure 1 system

Figure 2 registration logic

Figure 3 subsequent log-ins

SYSTEM AND METHOD FOR BLOCKING UNAUTHORIZED NETWORK LOG IN USING STOLEN PASSWORD

RELATED APPLICATIONS

This application is a continuation-in-part of and claims priority from co-pending U.S. patent application Ser. No. 11/257,421, filed Oct. 24, 2005, which is a continuation-in-part of U.S. patent application Ser. No. 11/077,948, filed Mar. 11, 2005, which in turn is a CIP of Ser. No. 10/892,584, filed Jul. 15, 2004 now U.S. Pat. No. 7,676,834, all of which are incorporated herein by reference.

FIELD OF THE INVENTION

The present invention relates generally to providing secure access to a website with sensitive data, such as an online banking server.

BACKGROUND OF THE INVENTION

Passwords are a ubiquitous way to provide a minimal level of authentication to a computer user seeking to access a network computer such as a Web site. For instance, online banking requires a user to log in to a Web server of a financial institution using a user name and password that have been previously given to the user by the server. In this way, only a user (hopefully, the true account owner) who possesses both the user name and password can gain access to the user's account.

As another example, some Web servers provide subscription services. For instance, users can subscribe to a Web site to receive news publications, music titles, etc. To ensure that only users who have paid the subscription fee can access the content, a user seeking access is required to log in using a user name and password.

In either case, it is possible that a password can be stolen and information intended only for the rightful owner of the password consequently fall into the hands of a password thief. Some estimates for the year 2003 indicate that as many as two million Americans have had their online bank accounts raided, at an average loss of $1200 for a total loss in excess of $2 billion. A common way for thieves to gain access is to send official-looking emails to bank customers, requesting user names and passwords which, if the illegitimate requests are complied with, are then used to log in to online accounts and drain them of money. This tactic of user deception is commonly referred to as "phishing" and it is not the only possible way to spoof innocent users from divulging sensitive information to thieves.

SUMMARY OF THE INVENTION

A method is disclosed for selectively granting a user access to data while ensuring the user he or she is not being "phished". The method includes, at a Web server, receiving a user name and password from a user computer containing a valid machine ID and login key, and only if a cookie previously deposited on the user computer by the server, the user name, and the password are valid, granting access to the data to the user computer. As an anti-phishing measure, the method includes displaying a user-approved secret on one or more pages presented to the user so that the user can view the secret for anti-phishing confirmation.

The cookie can include a login key and a machine ID. The login key can be a first login key, and if the cookie, user name, and password are valid and access is granted to the user computer, a new cookie is downloaded to the user computer, with the new cookie including the machine ID and a second login key different from the first login key. The new cookie is then used in a subsequent login to the Web server, which may be, without limitation, an online banking server, a content subscription server, or a VPN server.

In another aspect, a system for impeding a thief possessing a password of a user from accessing information intended to be accessed by the user includes a user computer associated with the user and a server computer controlling access to the information. The server computer grants access to the information only upon receipt of a valid password and determination that a valid verification string resides on the user computer. The server computer also presents, on plural web pages presented to the user, a secret previously approved by the user and correlated to a user identification.

In still another aspect, a method for selectively granting a user access to data includes, at a server, receiving a user name and password from a user computer, and determining whether a cookie previously deposited on the user computer includes a machine ID matching a machine ID prestored in a database and a login key matching a login key prestored in a database. If so, the user computer is granted access to the data and the login key is refreshed. Also, a secret associated with an identification of the user is retrieved and presented on one or more web pages presented to the user.

In another embodiment, a method for selectively granting a user access to data includes receiving a user name and password at a Web server from a user computer. The method also includes providing a one-time pass code to the user over a phone link, and only if a cookie previously deposited on the user computer by the server, the user name, the password, and the one-time pass code are valid is access granted to the data to the user computer.

In example implementations an audible phrase can be received over the phone link and compared to a stored biometric, and based on the comparison it is determined whether to provide the pass code over the phone link. The pass code may be provided over the phone link as a secondary mode only if a primary mode of provision of the pass code has failed, or it can be provided over the phone link as a primary mode of provision of the pass code.

In another embodiment, a system for impeding a thief possessing a password of a user from accessing information intended to be accessed by the user from a user computer includes a server computer controlling access to the information. The server grants access to the information only upon receipt of a valid password and determination that a valid verification string resides on the user computer and further upon reception of a valid one-time pass code. The pass code is selectively provided to the user over a phone link.

In another aspect, a method for selectively granting a user access to data includes, at a server, receiving a user name and password from a user computer, and at a server determining whether a cookie previously deposited on the user computer includes a machine ID matching a machine ID stored in a database and a login key matching a login key stored in a database. If so, the user computer is granted access to the data, and the login key is refreshed. On the other hand, if the machine ID does not match the machine ID stored in a database, a pass code is sent to a telephone associated with the user. Access is granted only if the pass code is received from the user computer.

In another embodiment, a service is disclosed for permitting a customer institution to establish authentication rules for end users to access information at a server operated by the institution. The service includes permitting the customer institution to access an authentication web page listing plural authentication factors and permitting the customer institution to select one or more factors on the list for implementation thereof in allowing end users to access information at the server operated by the institution. The factors may include custom security questions being properly answered, predefined security questions being properly answered, one-time pass code being correctly input, pass code delivery to user via email, pass code delivery to user via short message service (SMS), pass code delivery to user via interactive voice response (IVR), pass code delivery to user using voice biometrics, proper cookie on user machine seeking access, authentication based on satisfactory geographic location of user machine seeking access, authentication based on proper browser version of machine seeking access, authentication based on acceptable internet service provider of machine seeking access. The factors may further include authentication options related to the voice biometric factor including one or more of a number of devices required for enrollment, whether enrollment is optional or required, a frequency with which end users much re-enroll, a human language used to deliver the pass code, a telephone number to dial to access a voice pass code delivery system, an expiration time of a session ID, and an expiration time of the pass code.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
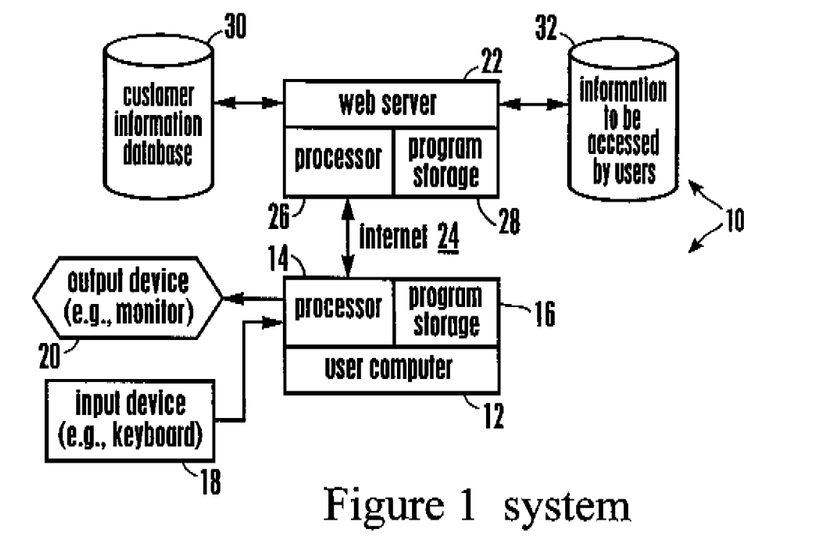
FIG. 1 is a block diagram of an exemplary system for implementing the present invention.

Referring initially to FIG. 1, a system is shown, generally designated 10, that includes plural user computers 12 (only a single user computer shown for clarity) each of which can have a processor 14 and disk and/or solid state program storage 16 for storing software embodying logic. Also, each user computer 12 can include one or more input devices 18 such as keyboards, mice, voice recognition devices, etc. as well as one or more output devices 20 such as monitors, printers, other computers, etc. The authentication logic executed by the present system and discussed herein may be used in applications such as but not limited to online banking, secure online e-commerce, and VPN access control.

As shown in FIG. 1, the user computer 12 communicates with a Web server 22 over the Internet 24. The server 22 has a processor 26 and disk and/or solid state program storage 28 for storing software embodying logic including all or part of the logic discussed further below. The server 22 may access a customer information database 30 that contains the log in and registration information on users set forth further below, it being understood that the database can be pre-populated with user information on existing customers who elect to start up the present service. Also, the server 22 may access an information database 32 to supply users with desired information, e.g., bank account records, subscription content, etc. The databases 30, 32 may be implemented in a single data structure if desired.

Figure 2:
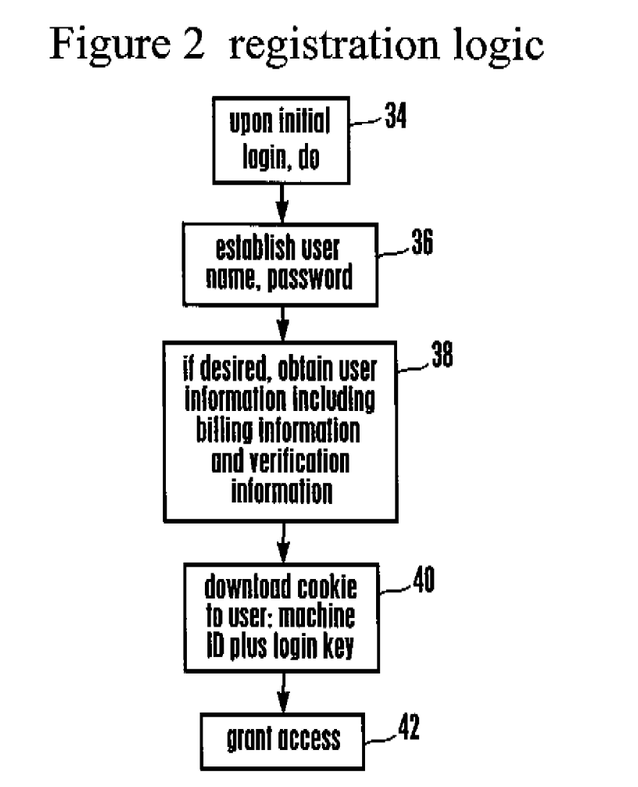
FIG. 2 is a flow chart of the registration logic.

Now referring to the initial registration logic of FIG. 2, commencing at block 34, the user logs in for the initial time. Moving to block 36, a user name and a password are established, for instance by allowing the user to select a user name and password or with the server 22 conferring a user name and password on the user. In block 38, additional user information can be obtained if desired. Such user information might include billing information and validation information. The validation information can be confidential to the user so as to protect his account from outside unwanted users who might have stolen the users account information, in accordance with further logic set forth below. It is to be understood that the validation information alternatively can be previously obtained from the user in various ways, online or off-line.

At block 40, at the same time the user registers or subsequently in the case of users who are already registered with the server for other purposes but now for the first time commence the present service, the user(s) computer is sent a verification string. The verification string is preferably but not necessarily one that does not require user interaction or special software, such as a cookie that can have a machine ID and a login key, e.g., a 4096 bit string with randomly generated value. The cookie may also have a user ID that is unique to a person. The cookie requires no special client software and is completely invisible to the user. Both the machine ID and the login key are randomly generated, stored on the server, and associated with that user's account. Once the users account is established, the machine ID and the login key become associated with that user's account. Access is granted if all user information and user account information is correct, shown in block 42.

Figure 3:
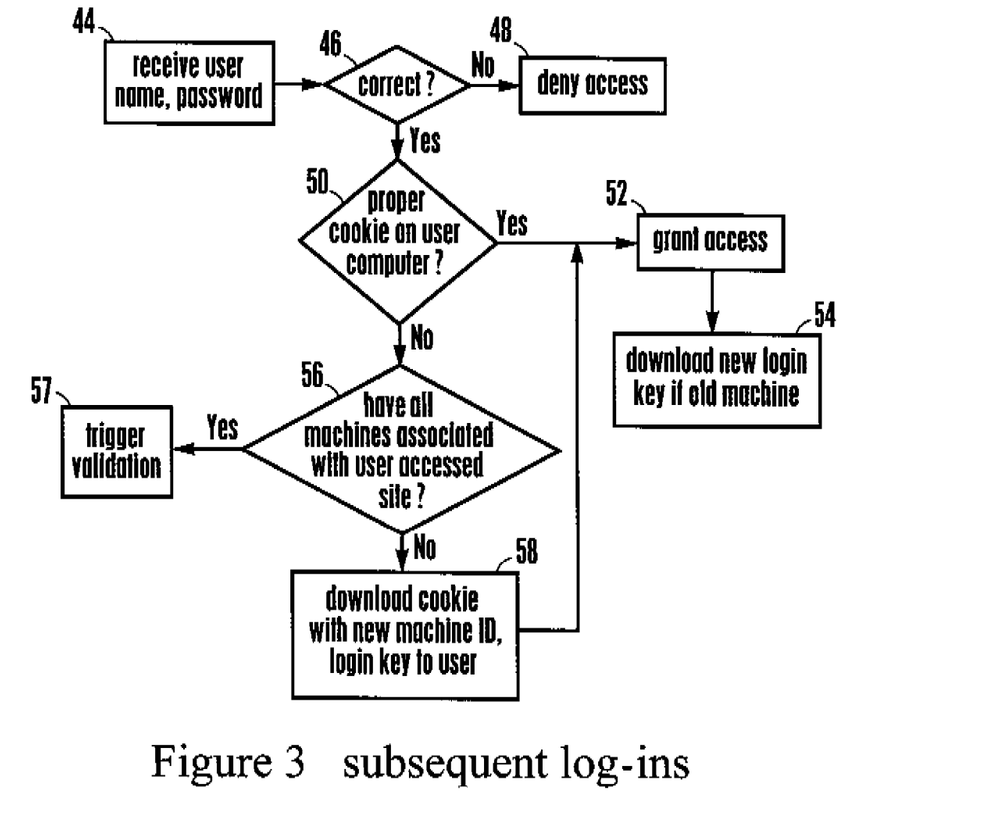
FIG. 3 is a flow chart of the subsequent log in logic.

After registration the logic that can be implemented by the server 22 moves to FIG. 3 for subsequent attempts by the user to log on to the server 26 and access the user information contained in the database 32 shown in FIG. 1. Beginning with block 44, upon subsequent logins the user enters the user name and password. At decision diamond 46, the server checks the user name and password's validity. If the user name and password are not correct, user access is denied at block 48.

If, at decision diamond 46, it is determined that the user name and password are correct, the logic flows to decision diamond 50 wherein the server checks the users computer to verify the correct cookie is stored on the user(s) computer by, e.g., comparing the cookie on the user's computer with server cookie records. If the server determines the cookie is present and correct, access to the user information in the database 32 is granted at block 52. Then, at block 54, assuming that the machine being used is not a newly entered machine as discussed further below in relation to block 58, a new login key carried on a new cookie preferably over an SSL encrypted link is downloaded. This new cookie with new login key is used for the next user login using the same machine. The login key in the new cookie is different from the login key of the old cookie but the machine ID stays constant.

In contrast, if, at decision diamond 50, it is determined that the cookie on the user computer is not correct, in some optional embodiments the server 22 moves to decision diamond 56 to determine whether all the computers that have been allocated to the user have accessed the server 22. In other words, in some applications such as online banking the server may allocate to the user at registration, in response to a user request, more than a single computer (i.e., to use N computers, N>1) to access the information in the database 32. For instance, an online banking customer might want to access his bank account from both an office computer and a home computer. If all of the AN@ allocated computers that have been allocated to the user have accessed the server 22 and have been granted cookies, meaning that the currently used computer is in excess of the authorized number, user access is denied and the logic flows to block 57 to trigger a validation process. If desired, to foil a dictionary attack only a limited number of login/cookie verification attempts may be allowed from any one machine, after which the machine is locked out until successful validation occurs.

In a non-limiting implementation, the validation process can include the user entering the confidential information initially given in the initial login process. The validation information can be the user's mother's maiden name, the user's social security number, or some other information that preferably is personal to the user. The server 22 then checks the user input against the validation information that was gathered at block 38 in FIG. 2. If a match is found, validation is successful and the user is granted access; otherwise, validation is unsuccessful and access is denied.

In some implementations the validation process can include sending an email to the user. The email can contain a hyperlink to a Web site at which a new cookie that is valid for accessing the data may be obtained. If desired, access to the Web site at which a new cookie may be obtained can be disabled after the user clicks once on the hyperlink. Or, the validation process can include prompting the user to call a telephone number to verify predetermined information, or to access a Web site to verify predetermined information online. Once validation is successful, the server 22 permits access to the information in the database 32.

In contrast, if the server determines at decision diamond 56 that not all machines that have been allocated have accessed the server 22, a new cookie with a new machine ID and login key is downloaded to the new computer at block 58. The logic then loops back to block 52 to grant access, in some embodiments only after having triggered the validation first as described at block 57 to ensure that the correct user is logging in.

In the context of adding a new machine when more than a single user computer is authorized, the new machine can be automatically added at its first login in accordance with the logic above (assuming the above-described conditions have been met), or the server can ask the user of the new machine whether the new machine is to count as one of the N authorized machines, temporarily or otherwise. If the user indicates that the machine is to be temporary only (e.g., if the user is operating a terminal at a hotel), the user could specify an expiration date and/or number of logins after which any access to the user information from that machine would be denied, or at the least would trigger the verification process once again. This can be done by causing the cookie to be designated "expired" at the end of the period. For instance, at an in-hotel room terminal, a user might specify an expiration at the expected check out time, or a user could specify a number of logins to allow from that machine before the verification process is triggered again. The expiration information is stored at the server. When a machine expires, the number of new machines remaining to be added to the user's account may be reset by one. In contrast, the user would not be asked for temporary use information when communicating with the server from a core set of computers from which the user has authorized permanent access. One or more pieces of the above information that is transmitted between computers may be encrypted using, e.g., AES encryption.

Figure 4:
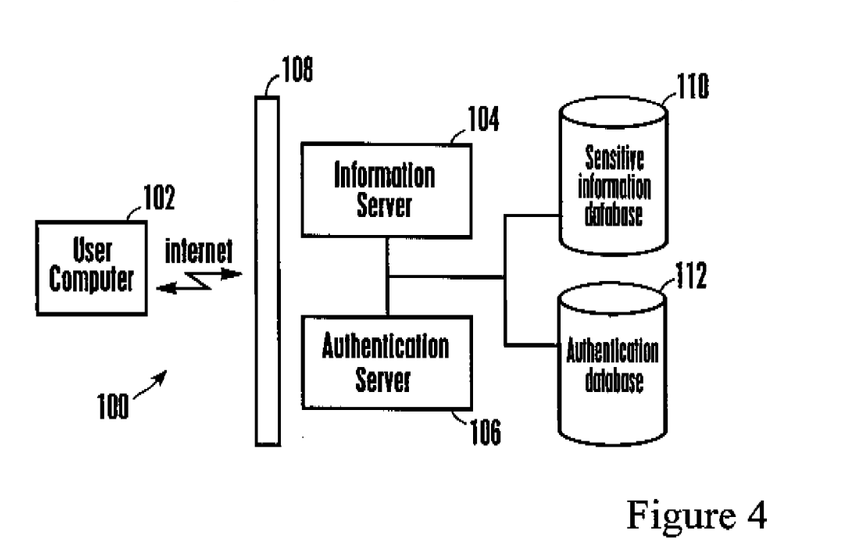
FIG. 4 is a block diagram of another non-limiting system.
Figure 5:
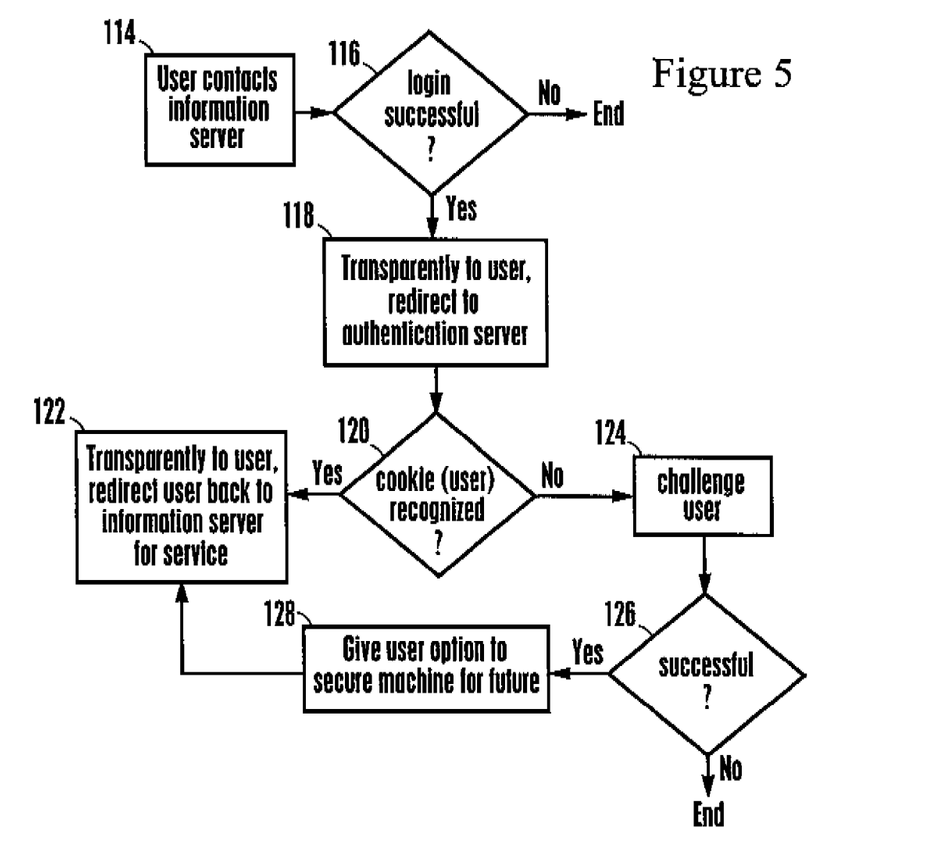
FIG. 5 is a high level flow chart of the logic used by the system shown in FIG. 4.

FIGS. 4 and 5 show specific preferred implementations of the above logic and system. For simplicity, FIG. 4 omits certain details such as input devices and output devices. A preferred system 100 can include one or more user computers 102 that communicate via the Internet with, e.g., an information server 104 of a financial institution. The information server 104 communicates with an authentication server 106. Both the servers 104, 106 preferably are behind a firewall 108. While only a single information server 104 and only a single authentication server 106 are shown, it is to be understood that server clusters can be used. For instance, J2EE clusters that use memory replication session persistence can be used, where individual objects in the Httpsession are serialized to a backup server as they change, providing high performance and scalability. Also, when the authentication server 106 is behind the firewall 108, the use of secure socket layer (SSL) may not be necessary, although if access is required from an Extranet, SSL may be used.

In any case, the purpose of the system 100 is to permit controlled access of the user computer 102 to data in a sensitive information database 110, using authentication information in an authentication database 112. The information server 104 and sensitive information database 110 may be the conventional server/database used by, e.g., a financial institution, with the exceptions noted below. In contrast, the authentication server 106 and authentication database 112 may be add-ons in accordance with present principles. In any case, the databases herein may be, e.g., SQL servers, DB2 servers, Oracle servers, or lower end servers such as MySQL.

The logic of a preferred implementation of the logic is shown in FIG. 5.

FIG. 5 shows a high level logic flow that may be implemented by the system 100 shown in FIG. 4. Commencing at block 114, the user contacts the information server 104 using the user computer 102. This contact usually entails an initial authentication such as a login process that includes entering a user name and password. If the login process fails at decision diamond 116 the logic ends, but if it is successful the present invention proceeds to block 118, wherein user computer communication, transparently to the user, is transferred to the authentication server 106. Communication between the servers 104, 106 may use SOAP principles known in the art.

At the authentication server 106, it is determined at decision diamond 120 whether the machine is recognized (using the machine ID in the above-disclosed cookie) and has been previously secured by the user (using the login key). This can be thought of as a secondary authentication process. If the test passes, the logic moves to block 122 to (transparently to the user) transfer the user back to the information server 104 for further service, e.g., for online banking transactions. On the other hand, if the test at decision diamond 120 fails, the logic can move to block 124 to challenge the user in accordance with principles set forth herein, which challenge might be thought of as a tertiary authentication process. For instance, an email or wireless telephone short message service (SMS) message or outbound telephone call using Interactive Voice Response (IVR) principles can be sent to the user, containing a randomly generated single-use only personal identification number (PIN) code which is supplied by the authentication server 106. This single-use PIN code can then be sent by the user to the authentication server 106 using the user computer 102, to prove that the user is authorized access. The below-described biometric information test may also be used to trigger this challenge or indeed after reception of the PIN code to further verify user authenticity.

If the challenge is met successfully at decision diamond 126, the user is given the option at block 128 of securing the specific machine being used for future use, and then the user is redirected to the information server at block 122. Otherwise, the process ends without giving the user access.

Figure 6:
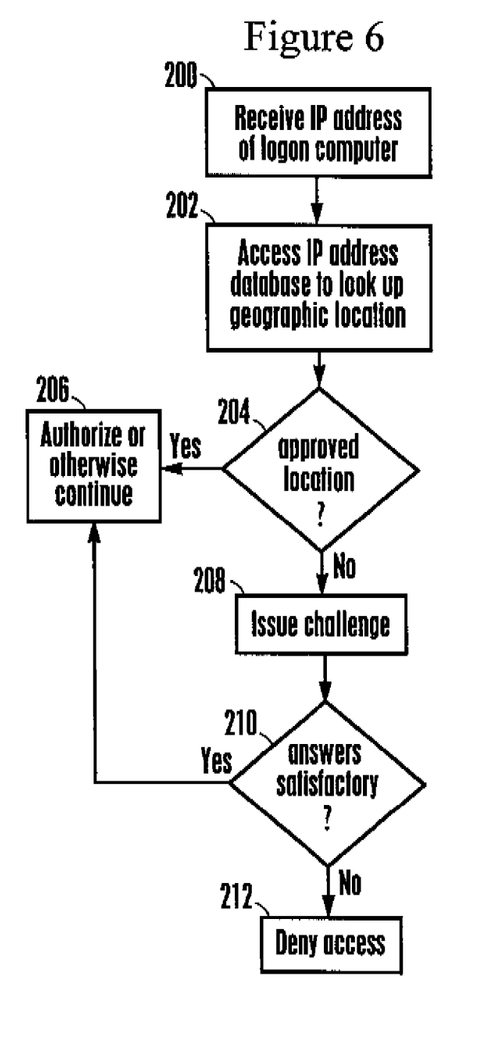
FIG. 6 is a flow chart of geographic verification logic.

Now referring to FIG. 6, in addition to (e.g., at any convenient point in the logic) or indeed in lieu of the logic of FIG. 4 or 5, geographic location can be used to determine whether to challenge a user to provide additional authentication information. In the example shown in FIG. 6, the IP address of a computer attempting to gain access is received by the authentication server, which accesses a database of IP addresses at block 202 that correlates IP addresses to geographic location, typically country, state, city, and postal code. Other examples of geographic location can be ISP (since the ISP has a location related to the user attempting to log on), and time zone. In addition, geographic location can be tied to a location type, e.g., a cyber cafe. In any case, the database may be obtained from or operated by an independent entity. Using the IP address as entering argument, the geographic location associated with the IP address is obtained.

Proceeding to decision diamond 204, it is determined whether the geographic location, e.g., country and/or state and/or city and/or postal code and/or time zone and/or ISP identity and/or location type, e.g., a cyber cafe, is an approved location. This determination may take on several facets. For example, a list of "disapproved" locations may be implemented, and if the looked-up geographic location is not on the list, the test at decision diamond 208 is positive. Or, a list of only approved locations may be implemented, and only if the looked-up geographic location is on the list is the test at decision diamond 206 positive. Yet again, a combination of the two lists may be used, so that, for example, entire countries may be placed on a "disapproved list" and if the geographic location is not on the "disapproved" list, the logic accesses an "approved list" to determine, e.g., whether the particular postal code is an approved postal code or not.

One non-limiting way to determine whether a location should be approved or not is to observe the IP addresses associated with failed log in attempts and note whether a disproportionate number of failed attempts comes from IP addresses associated with a particular location.

If the geographic location is approved, access authorization is granted at block 206. In the alternative, depending on where the logic of FIG. 6 is implemented in conjunction with other authentication logic, e.g., depending on where the geographic location logic is inserted into the flow of FIG. 4 or 5, the remaining authentication process is allowed to proceed.

In contrast, if the geographic location is not approved, the logic may simply end without granting access, but more preferably the logic flows to block 208 to issue a challenge such as one of the above-mentioned challenges. The user's response to the challenge is tested at decision diamond 210 for sufficiency, and if the user successfully responds to the challenge the logic loops back to block 206. Otherwise, access is denied at block 212.

In addition to using geographic location as a test, biometric information may be used. For example, the logic of FIG. 6 may replace the geographic location test with a biometric test, e.g., to determine whether the user's voice as might be received over a VOIP connection matches an approved voice.

A successful match may precipitate access authorization or at least permission to undertake the remaining logic of FIG. 4 or 5, for instance. Other biometric tests such as eye recognition or fingerprint recognition may be used.

Figure 7:
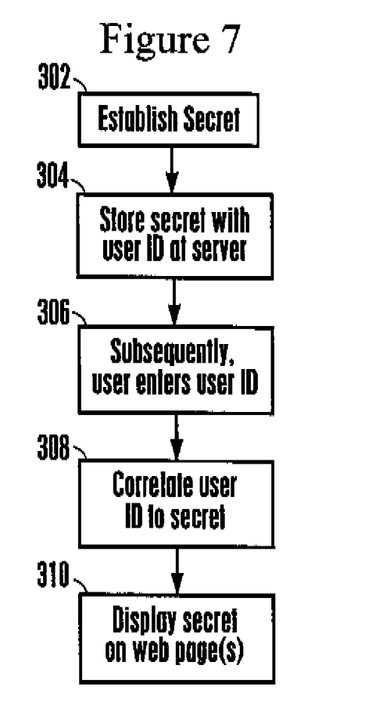
FIG. 7 is a flow chart of logic for verifying the authenticity of a website.

Now referring to FIG. 7, in addition to the above logic, logic may be provided to confirm for a user the authenticity of the website. Beginning at block 302, the user establishes a secret with the web site. This unique secret is known only to the particular user and the site itself, and may be a word, sentence, or random character string selected by the user. At block 304 the web site stores the unique secret associated with the user's unique identifier in the web site's database (i.e., secrets and respective user IDs are stored on a one-to-one relationship basis) so that the secret may be displayed to the user when the user accesses web pages associated with the authentic web site.

Once the initial secret has been established, at block 306 a user must enter at least one unique identifier, such as a username and/or a password. This identifier is referenced at block 308 by the genuine website, which recognizes the unique identifier. Once the unique identifier has been associated with the particular user, the logic concludes at block 310 where the secret associated with (and, recall, determined by) the particular user can be displayed on the page being viewed. In some implementations the secret is displayed on every subsequent page of the web site, including the rest of the login pages such as a page where a password must be entered or any alternative or additional validation steps that may be associated with a login.

By displaying the unique secret, the website enables the user to verify the authenticity of the site. A false, or "phished," site would not display the unique secret on each page. Only an authentic site will display the unique secret on subsequent screens because the unique secret can only be produced by the authentic website. If the unique secret is not displayed or does not match the predetermined secret created at block 202, then the user may determine that the site being displayed is not the authentic site the user intends to access and take steps accordingly, such as alerting the user's bank by phone.

In some implementations, the features above may be provided to customers of the system in what might be thought of as a "cocktail" approach in which a customer may select some features (custom security questions, defined security questions, pass code (sometimes referred to as a one-time PIN) via email, pass code via SMS, pass code via IVR, pass code via voice biometrics, and verification link) and authentication criteria (device ID/encrypted cookie, login count, location (country, state, city and zip code) as well as network information such as ISP and browser version) to choose from based on their customer (obtrusiveness and convenience) and security (what threats are they mostly concerned with) needs.

Moreover, the above-described features are not necessarily constrained to Web applications. For example, the systems and methods described above may be implemented in virtual private networks, automatic teller machines, operating systems, PDA/Smart Phone (wireless) devices, and other non-web applications.

As indicated above, there may be times when the two-factor authentication provided by the login information (user ID and password) and cookie information (including machine ID and one-use only login key) may need to be supplemented by additional authentication steps. In addition, the present invention provides a way for individual customer institutions, e.g., banks to further tailor authentication if they so desire by requiring various authentication steps even when the login information and cookie information are found to be valid.

Figure 8:
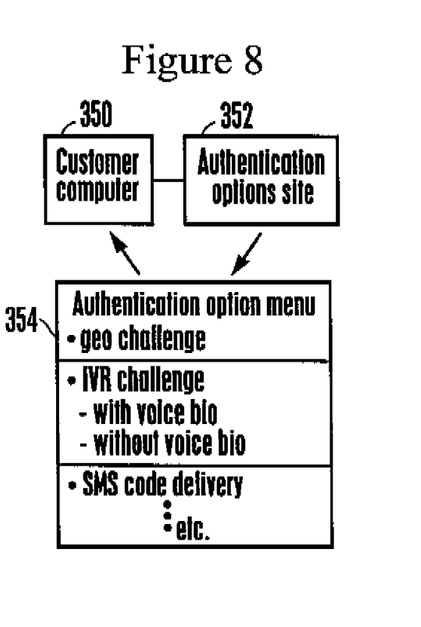
FIG. 8 is a schematic block diagram of an architecture to allow a customer to select authentication methods.

In other words, some non-limiting implementations of the present invention can adopt a holistic approach to authentication in providing an authentication framework with a unique set of security tools and configuration options for each customer. A number of different authentication challenges can be triggered when suspicious transactions, policy violations or out-of-norm behavior is recognized. These security options can be customized by a client institution such as a bank and configured for different user groups through a centralized administration console in real time, as shown in FIG. 8 and described further below. The solution is completely software based and does not require any hardware tokens or client-side software downloads although it could easily be extended to include non-software based components. The solution can either be deployed onsite behind customer firewalls and proxies or as a service. This services-based model allows organizations to invoke desired authentication services from anywhere in the world leveraging shared hardware and software resources from a centralized location. The solution delivers multi-factor authentication through the use of every day devices that are already in the hands of end users, such as cell phones, home phones, web connected computers, and office phones. This dramatically lowers the cost and greatly reduced the complexity of providing strong authentication to a large, diverse population. Example embodiments of the system can also provide end users with real time fraud alert that is triggered any time a fraudster is able to produce a password linked to a given user name.

As shown in FIG. 8, a customer institution can use an enterprise customer computer 350 to access an authentication options web site 352 to select authentication features from a graphical user interface (GUI) such as the non-limiting screen display 354 shown in FIG. 8, it being understood that the screen 354 is provided by the web site 352 to the enterprise customer computer 350. As shown, one or more of a number of different authentication methods can be selected using the GUI, including SMS delivered pass code to a wireless phone, voice delivered pass code to a wireless or landline phone using Interactive Voice Response (IVR) discussed further below in reference to FIG. 10, voice delivered pass code to a wireless or landline phone using voice biometric speaker identification, text delivered pass code to an email account, user defined security questions, institution defined security questions, email delivered verification link and knowledge based authentication from both public and private data sources. In addition, a number of configuration options may be provided to dictate criteria for when to provide stronger authentication by invoking further challenges on the end user. Those include, in addition to checking for a proper device ID (cookie), login counts and patterns, behavior analytics, location based analytics via IP Geolocation and network based analytics and comparisons.

Furthermore, the institution may be permitted to choose a number of additional configuration options for the voice biometric feature discussed below in reference to FIG. 9. This can include the number of devices required for enrollment, whether enrollment is optional or required, the frequency with which end users much re-enroll, the language the system speaks in to deliver the pass code, the number to dial to access the voice system, the expiration time of the session ID, and the expiration time of the pass code. This authentication method can be used in combination with any other authentication method in the solution set.

As recognized herein, this layered approach of providing authentication options for the customer institution to configure based on perceived security threats, user intrusiveness, flexibility and intuitiveness in real time provides an extremely powerful solution that allows the customer institution to maximize adoption and reinforce loyalty.

Figure 9:
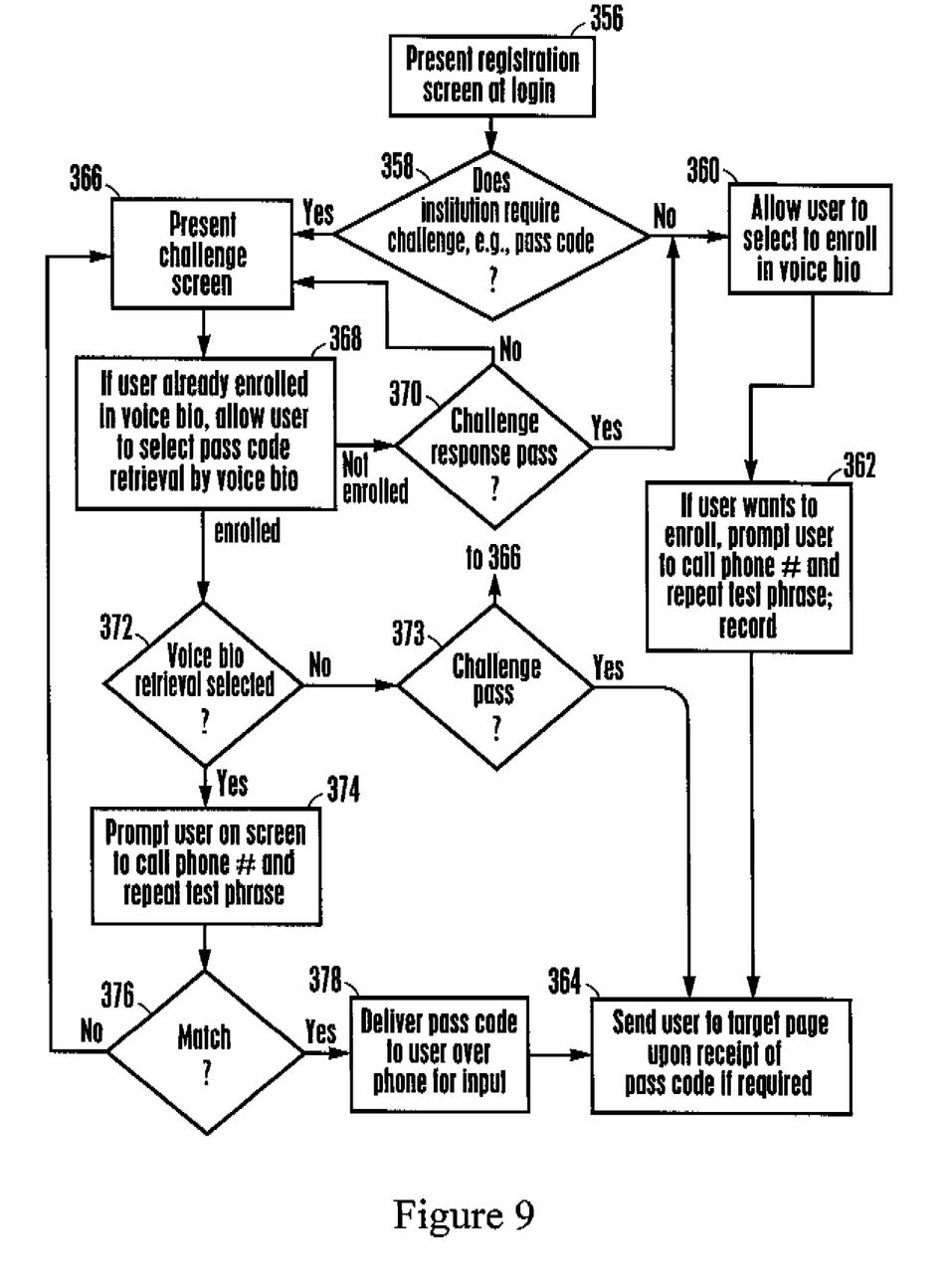
FIG. 9 is a flow chart of example logic for selecting example features in the architecture of FIG. 8.

FIG. 9 shows non-limiting logic that can be used to enroll end users (such as bank customers) of a client enterprise (such as a bank) to enroll in a voice biometric system that allows the end users to retrieve individual pass codes by calling a number and having their voiceprint authenticated. This authentication method can be used either as a backup option in case the end user's primary delivery method (email, text message or voice) fails to deliver the pass code or as a primary authentication method.

Beginning at block 356, a registration screen is displayed to a user at login. In some embodiments, the following logic may be invoked only upon receipt of proper login name and password and verification that the previously-deposited cookie is present on the user's machine in accordance with above principles.

Assuming login and cookie verification are successful when these tests are required, the logic moves to decision diamond 358 to determine whether the particular institution into which the user is trying to gain access has imposed a further authentication requirement in the form of proper entry of a one-time pass code that is different from the password described above. If not, at block 360 the user is permitted to enroll in a voice biometric program, wherein if the user wishes to enroll, he is prompted at block 362 to call a predetermined phone number, enter a session ID number if desired, and repeat a predetermined phrase a predetermined number of times. The user's voice is recorded and correlated to the user's name, and then the user is sent to the target page of the institution at block 364. When the user does not wish to enroll and no pass code is required by the institution, the user is sent directly to the target page from block 360.

On the other hand, when the institution has levied the additional requirement of proper receipt of a one-time pass code, the logic moves from decision diamond 358 to block 366 to present a challenge screen to the user, demanding entry of the one-time code. As mentioned above, the pass code may be delivered via a secondary channel upon successful login in one of various ways, e.g., by SMS text message to the user's phone, email, etc. In some implementations, these are primary delivery mechanisms and the below-described interactive voice response (IVR) is secondary; in other implementations, IVR is primary.

Block 368 indicates that if the user is found to be enrolled in voice biometrics he can be permitted to choose to receive the pass code by voice biometrics. This might be the user's choice when, for instance, a primary pass code delivery mode did not work properly (e.g., if the user's email server is down), and the user cannot otherwise obtain the pass code for input. Or, it can be the user's choice when the voice delivery of the pass code is the primary delivery mode.

If the user is not already enrolled in voice biometrics, the logic can move to decision diamond 370 to determine whether the user input the correct pass code on his user computer in response to the onscreen challenge at block 366. If not, the challenge screen is presented again. If the user successfully input the pass code, however, the logic may move to block 360 to allow the user to enroll in voice biometrics as described above, eventually sending the user to the target page at block 364 in accordance with previous disclosure.

Returning to block 368, if the user is enrolled but elects not to retrieve the pass code via voice biometrics at decision diamond 372, the user can be sent to the target page at block 364 assuming proper entry at decision diamond 373 of the pass code, which has been delivered to the user by the other means discussed above. Of course, as indicated by decision diamond 373 if the user fails to enter to correct one-time pass code in response to the challenge the process reverts to block 366.

If the user chooses to obtain the pass code by voice biometrics at decision diamond 372, the process can move to block 374. A screen can be presented to the user prompting the user to call a predetermined phone number, enter a session ID number if desired, and repeat a predetermined phrase. If a match with the voice biometrics recorded during enrollment at block 362 is found at decision diamond 376, the logic may move to block 378 to deliver the pass code to the user by automated voice over the phone. The logic of FIG. 10 may be invoked for this purpose, or the pass code may be immediately delivered in the same telephone call to the user. Upon proper entry of the pass code into the challenge screen the user can be directed to the target page at block 364. Failure of a voice biometric match at decision diamond 376 may result in looping back to block 366 as shown.

The user may update his test voice print if desired by being presented an update page, which can be selected to re-invoke the enrollment process discussed above.

When analyzing the user's voice both during enrollment and subsequent pass code delivery, the invention may analyze voice samples for both audio quality and consistency. End users must repeat the same phrase essentially the same way. If the samples have good audio quality and sound similar to each other, they are accepted by the system.

Figure 10:
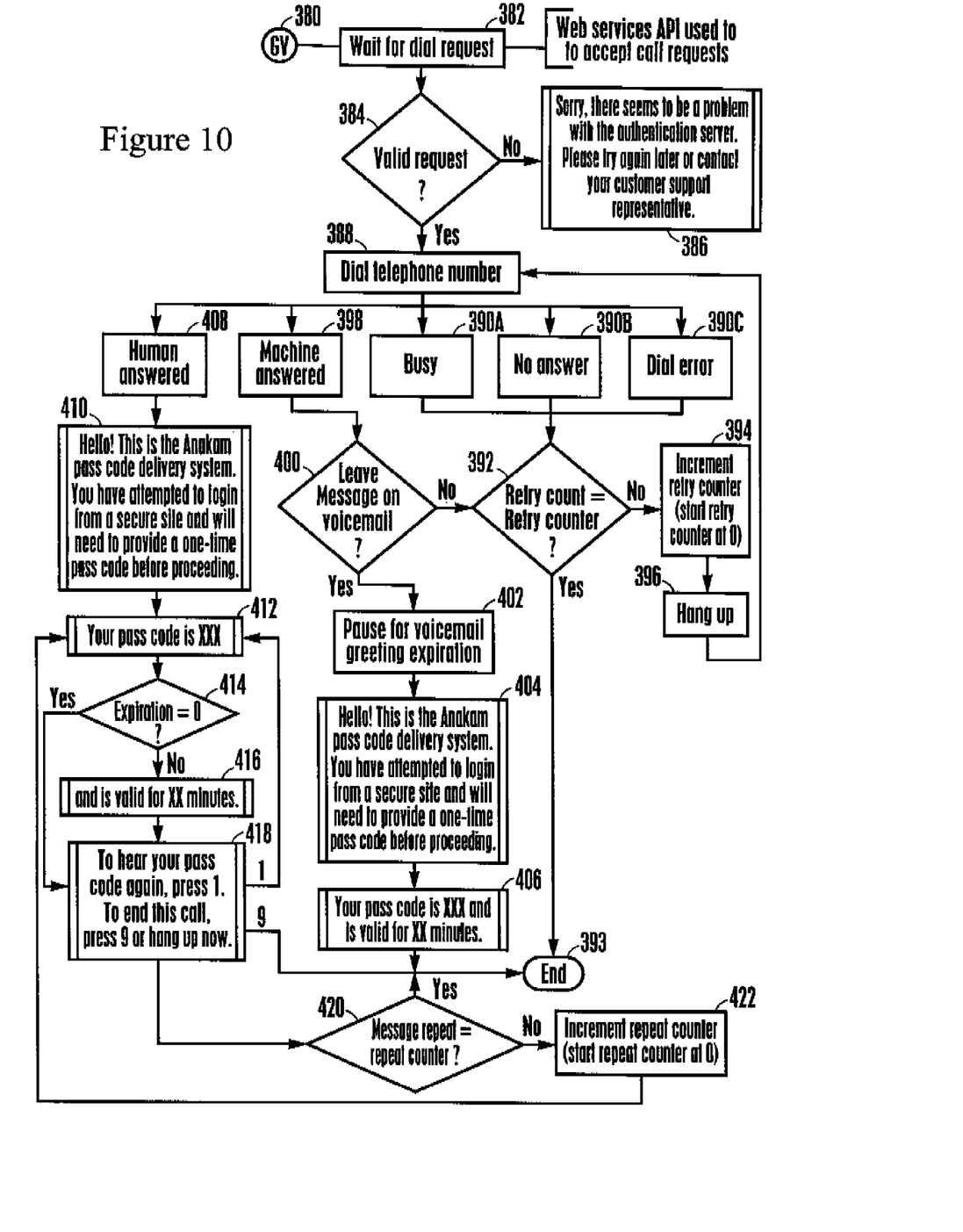
FIG. 10 is example logic for using interactive voice response (IVR) for authentication.

FIG. 10 shows how a one-time pass code can be delivered to a user by means of interactive voice response (IVR). In summary, the Interactive Voice Response feature may place an outbound call and transmit a spoken one-time pass code to a wireless or land line phone that has been pre-registered by the end user. The administration screen 354 shown in FIG. 8 may permit the institution to define a number of different configuration options for the IVR feature. These can include the language the system speaks to deliver the pass code, whether the pass code should be delivered to voice mail if the end user does not answer or is not reachable, the number of times the pass code should be repeated, the number of times the outbound call is made if there is no answer, and the expiration time of the pass code. This authentication method can be used in combination with any other authentication method in the solution set.

Turning to the details of FIG. 10, beginning at start state 380 the system waits for a dial request at block 382. Web services application programming interfaces (API) can be used to accept call requests. If no valid request is received at decision diamond 384, a message can be presented to the user at block 386 to the effect that pass code delivery cannot be made.

On the other hand, when a valid request is present at decision diamond 384 the logic can move to block 388 to dial the user's telephone number. If the phone is busy (block 390A) or there is no answer (block 390B) or there is a dial error (block 390C), the logic may move to decision diamond 392 to determine if a dial retry count (which equals the number of dial attempts made since a valid request was received at decision diamond 384) equals a predetermined counter, and if so the process ends at state 393. Otherwise, the retry count may be incremented at block 394, the systems can disconnect at block 396, and then loop back to block 388 to redial.

If, at block 398, a user's answering machine answers the call that was placed at block 388, the logic can proceed to decision diamond 400 to determine whether the institution and/or user has permitted a pass code message to be left on the machine. If not, the logic can move to decision diamond 392 to proceed as explained above. If a message has been authorized, however, the logic can move to block 403 to pause to wait for the recorded greeting to end, and then to audibly deliver an introduction message if desired at block 404 prior to audibly delivering the pass code at block 406, along with a time for which the code will remain valid, if this feature has been enabled by the institution. The process then ends at state 393.

If, at block 408, a user's live voice answers the call that was placed at block 388, the logic may audibly deliver an introduction message if desired at block 410 prior to audibly delivering the pass code at block 412. If a time for which the code will remain valid has been enabled by the institution as indicated by a negative test at decision diamond 414, the user may be audibly informed at block 416 of the length of time the code will remain valid. In either case, the user may be given the option of repeating the code at block 418, which if selected causes the logic to loop back to block 412. If desired, a message repeat limit can be set, in which case the logic can determine at decision diamond 420 whether the message has repeated the predetermined number of times, incrementing a repeat counter at block 422 when it has not and otherwise ending at state 393 when it has.

While the particular SYSTEM AND METHOD FOR BLOCKING UNAUTHORIZED NETWORK LOG IN USING STOLEN PASSWORD is herein shown and described in detail, it is to be understood that the subject matter which is encompassed by the present invention is limited only by the claims.

What is claimed is:

1. A method for authenticating a user to grant access to data by the user:
    at a Web server, responsive to receiving by a first channel a user name and password that are valid from a user computer, determining that a cookie previously deposited on the user computer includes a machine ID and a login key that are invalid based on respectively comparing the machine ID with a test machine ID and a stored key;
    responsive to determining that the machine ID and the login key are invalid, (i) receiving an audible phrase over a second channel, the second channel being a different type of channel than the first channel and (ii) determining an access right for the user computer by:
        comparing the audible phrase to a stored biometric associated with the user;
        responsive to determining that the audible phrase matches the stored biometric, providing a pass code in a user-defined human-readable language to the user computer over the second channel subsequent to determining that the audible phrase matches the stored biometric; and
        responsive to receiving the pass code from the user computer over the first channel, granting access to the data to the user computer.

2. The method of claim 1, wherein the Web server is an online banking server or content subscription server.

3. The method of claim 1, wherein providing the pass code to the user over the second channel in the user-defined human language comprises providing a one-time pass code over a phone link as the second channel in response to determining a primary mode of provision of the one-time pass code that is different than the phone link has failed.

4. The method of claim 1, wherein the second channel comprises a phone link.

5. The method of claim 1, further comprising:
    responsive to receiving by the first channel the user name and the password are valid from the user computer, providing a web page to the user computer for display to the user, the web page comprising a secret previously established with the user.

6. The method of claim 1, further comprising:
determining a geographic location for the user computer; and
responsive to determining the geographic location for the user computer is an approved geographic location, granting the user computer access to the information.

7. The method of claim 6, wherein the geographic location comprises:
an identification of a political boundary in which the user computer is positioned; and
a type of location within the political boundary in which the user computer is positioned.

8. The method of claim 1, further comprising, responsive to granting access to the data to the user computer, providing a new cookie to the user computer, the new cookie including the machine ID, the new cookie being used by the Web server to validate the user computer in a subsequent login to the Web server.

9. A server comprising:
a processor; and
a non-transitory program storage comprising logic stored thereon, wherein the logic, when executed by the processor, is configured to cause the server to:
determine that a user name and a password received from a user computer via a first channel of communication are valid; and
respond to determining that the user name and the password are valid by:
determining that a cookie previously deposited on the user computer includes a machine ID and a login key that are invalid based on respectively comparing the machine ID and the login key with a test machine ID and a stored key;
responsive to determining that the machine ID and the login key are invalid:
(i) receiving an audible phrase over a second channel of communication, the second channel of communication being a different type of channel than the first channel of communication;
(ii) granting access to data to the user computer in response to determining that the audible phrase matches a stored biometric; and
(iii) providing a pass code in a human-readable language to the user over the second channel of communication and granting access to the data to the user computer in response to receiving the pass code over the first channel of communication.

10. The server of claim 9, wherein the server is one of an online banking server or a content subscription server.

11. The server of claim 9, wherein the logic is configured to cause the server to provide the pass code in the human-readable language to the user over the second channel of communication by:
providing the pass code in the human-readable language to the user over a phone link in response to determining that an attempt to provide the pass code over a primary mode of provision has failed.

12. The server of claim 9, wherein the logic is configured to cause the server to provide the pass code in the human-readable language to the user over the second channel of communication by:
dialing a telephone number associated with the user to cause a phone link to be established between the server and telephone equipment associated with the telephone number;
in response to receiving an audible response from a live person over the phone link,
audibly outputting the pass code in the human-readable language; and
in response to receiving an audible response from an answering machine over the phone link and in response to determining that providing messages to the answering machine is approved,
audibly outputting the pass code in the human-readable language.

13. The server of claim 9, wherein the logic is configured to cause the server to compare the audible phrase to the stored biometric associated with the user by analyzing voice samples of the audible phrase for an acceptable audio quality and for similarity with the stored biometric.

14. The server of claim 9, wherein the first channel of communication comprises an Internet communication channel and the second channel of communication comprises at least one of:
an audible phone link; or
a short message service phone link.

15. The server of claim 9, wherein the logic is further configured to cause the server to, in response to determining that the user name and the password received from the user computer via the first channel of communication are valid, provide a web page to the user computer for display to the user, the web page comprising a secret previously established with the user.

16. The server of claim 9, wherein the logic is further configured to cause the server to:
determine a geographic location for the user computer; and
approved geographic location by granting the user computer access to the information.

17. The server of claim 16, wherein the geographic location comprises:
an identification of a political boundary in which the user computer is positioned; and
a type of location within the political boundary in which the user computer is positioned.

18. The server of claim 9, wherein the logic, when executed by the processor, is further configured to cause the server to responsive to granting access to the data to the user computer, provide a new cookie to the user computer, the new cookie including the machine ID, the new cookie being used to validate the user computer in a subsequent login.

19. A system comprising:
a user computer associated with a user; and
a server configured for, in response to determining that (i) a user name and a password received from the user computer by a first channel of communication are valid and (ii) that a cookie previously deposited on the user computer includes a machine ID and a login key that are invalid based on respectively comparing the machine ID and the login key with a test machine ID and a stored key:
determining that the user has selected at least one of providing an audible phrase over a second channel of communication or receiving a one-time pass code over the second channel of communication;
based on determining that the user has selected providing the audible phrase, receiving the audible phrase over the second channel of communication, the second channel of communication being a different type of channel than the first channel of communication, and granting access to data to the user computer in response to determining that the audible phrase matches a stored biometric;

based on determining that the user has selected receiving the one-time pass code, providing the one-time pass code in a human-readable language to the user over the second channel of communication and granting access to the data to the user computer in response to receiving the pass code over the first channel of communication.

20. The system of claim 19, wherein the server is one of an online banking server or a content subscription server.

21. The system of claim 19, wherein the first channel of communication comprises an Internet communication channel and the second channel of communication comprises at least one of: an audible phone link; or a short message service phone link.

22. The system of claim 19, wherein the server is further configured to, in response to determining that the user name and the password received from the user computer via the first channel of communication are valid, provide a web page to the user computer for display to the user, the web page comprising a secret previously established with the user.

23. The system of claim 19, wherein the server is further configured for, in response to granting access to the data to the user computer, providing a new cookie to the user computer, the new cookie including the machine ID, the new cookie being used to validate the user computer in a subsequent login.

* * * * *

UNITED STATES PATENT AND TRADEMARK OFFICE
CERTIFICATE OF CORRECTION

PATENT NO. : 8,528,078 B2
APPLICATION NO. : 11/824694
DATED : September 3, 2013
INVENTOR(S) : Allan Camaisa and Jonas Samuelsson It is certified that error appears in the above-identified patent and that said Letters Patent is hereby corrected as shown below:

In the Claims

Claim 16, column 14, line 37, insert the phrase --respond to determining the geographic location for the user computer is an-- before the word "approved".

Claim 23, column 15, line 31, insert the phrase --by the Web server-- after the word "used".

Signed and Sealed this
Twelfth Day of November, 2013

Teresa Stanek Rea
*Deputy Director of the United States Patent and Trademark Office*